United States Patent [19]

Tokuda

[11] Patent Number: 4,482,238

[45] Date of Patent: Nov. 13, 1984

[54] BRIGHTNESS WARNING DEVICE FOR CAMERA

[75] Inventor: Ryuji Tokuda, Tokyo, Japan

[73] Assignee: Canon Kabushiki Kaisha

[21] Appl. No.: 333,575

[22] Filed: Dec. 22, 1981

[30] Foreign Application Priority Data

Dec. 27, 1980 [JP] Japan ................................ 55-186511
May 27, 1981 [JP] Japan ................................ 56-80318

[51] Int. Cl.³ ............................................. G03B 7/08
[52] U.S. Cl. .................................... 354/427; 354/460; 354/471
[58] Field of Search .................. 354/51, 53, 60 L, 289, 354/427, 459, 460, 471, 473

[56] References Cited

U.S. PATENT DOCUMENTS

| 3,958,256 | 5/1976 | Wagensonner et al. | 354/60 L |
| 4,041,504 | 8/1977 | Iodvalkis et al. | 354/60 L |
| 4,077,043 | 2/1978 | Nanba | 354/60 L |
| 4,112,443 | 9/1978 | Iguchi | 354/60 L |
| 4,122,465 | 10/1978 | Hasegawa et al. | 354/60 L |
| 4,129,366 | 12/1978 | Watanabe | 354/60 L |

Primary Examiner—Russell E. Adams
Attorney, Agent, or Firm—Toren, McGeady and Stanger

[57] ABSTRACT

A brightness warning device for a camera is disclosed, which has a warning means and a detecting circuit for detecting a charge level of the timing capacitor in the exposure amount adjusting circuit of the aforesaid camera upon attainment of the detecting level to a predetermined value to produce an output signal driving the aforesaid warning means.

5 Claims, 12 Drawing Figures

BRIGHTNESS WARNING DEVICE FOR CAMERA

BACKGROUND OF THE INVENTION

1. Field of the Invention

This invention relates to cameras, and more particularly to a brightness warning device for cameras for controlling the amount of exposure on the basis of the output of the photosensitive element.

2. Description of the Prior Art

In the conventional warning devices, the voltage obtained by compressing the current output of the photosensitive element, or by adding to this a predetermined bias voltage (the output signal of the light metering circuit) was used itself as a brightness information signal, and the level of said signal was discriminated to provide a brightness warning. However, since the output of the light metering circuit has a large temperature dependence, the output of the light metering circuit must be modified by using a complicated temperature compensation circuit to compensate for the temperature characteristics. Otherwise it could not be used as the above-mentioned brightness information signal.

SUMMARY OF THE INVENTION

An object of the present invention is to provide a brightness warning device of such a simple structure so as not to need a temperature compensation circuit, while still being capable of accurate brightness discrimination.

Another object of the invention is to provide a brightness warning device capable of brightness discrimination when in the light metering warning mode.

Still another object of the invention is to provide a brightness warning device which does not produce a bad influence on the exposure control of the camera.

These and other objects of the invention will become apparent from the following detailed description.

DESCRIPTION OF THE PREFERRED EMBODIMENT

Figure 1:
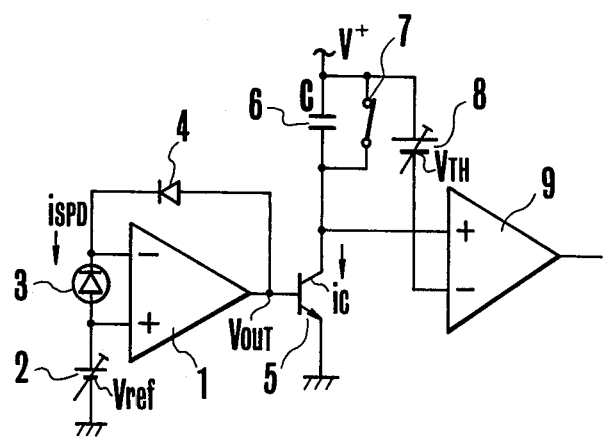
FIG. 1 is an electrical circuit diagram illustrating an example of an exposure control circuit in a camera suitable for application of the present invention.

Before an explanation of the brightness warning device of the invention, at first, using FIG. 1, an explanation about the temperature compensation used in the invention is made below. In FIG. 1, element 1 is an operational amplifier; element 2 is a bias voltage source for producing a voltage, or Vref.; element 3 is a photosensitive element such as a silicon photo diode; element 4 is a diode for logarithmically compressing the output signal from the element 3; element 5 is an expansion transistor; element 6 is a timing capacitor with capacitance C; element 7 is a count switch; element 8 is a voltage source for producing a voltage or $V_{TH}$ which is applied to one input terminal (−) of a comparator 9.

Now letting $i_{SPD}$ denote the photo-current of the photosensitive element 3 proportional to the intensity of light incident thereon, the expanded current, $i_C$, flowing through the collector of the transistor 5 may be expressed by:

$$i_C = i_{SPD} \times \text{EXP}\left(\frac{qV\text{ref.}}{kT}\right) \quad (1)$$

where
q: Charge (coulomb) per one electron
k: Boltzmann's constant
T: Absolute Temperature (°K.)

As is evident from the equation (1), the $i_C$ does not include an reverse saturation current, $i_S$, of P-N junctions which is a large factor of temperature dependence, due to the cancellation through the compression and the expansion but yet includes a variable of absolute temperature T in the equation, depending largely on temperature. Namely, since T is included in the exponential term, its slight change calls for a large change of the $i_C$. Therefore it is nearly impossible to compensate this large change by the compared reference voltage $V_{TH}$. Thus, many attempts have been made to match the output characteristic of the voltage source 2 to a characteristic proportional to the absolute temperature (which may be expressed by $\alpha T$, where $\alpha$: proportion constant). By putting Vref. $=\alpha T$, the $i_C$ is $$i_C = i_{SPD} \times \text{EXP}\left(\frac{q\alpha}{k}\right) \quad (2)$$

and is made independent of temperature. Here, if the $V_{TH}$ is made independent of the temperature, then we have a shutter time, t, defined by:

$$t = \frac{C \times V_{TH}}{i_{SPD} \times \text{EXP}\left(\frac{q\alpha}{k}\right)} \quad (3)$$

Thus, it is made possible to obtain an accurate shutter time control (exposure control) in inverse proportion to the current $i_{SPD}$ of the photosensitive element which is not affected by temperature.

In the system of such construction, if the output voltage of the operational amplifier 1 is used directly for discriminating low or high brightness as in the prior art, it would be impossible to assure the required accuracy of discrimination since the voltage value $V_{OUT}$ includes the largely temperature-dependent $i_S$ term as shown in the equation (4) and since the brightness level for discrimination of the low or the high brightness warning would vary with temperature to a large extent.

The present invention takes into account the fact that the $i_C$ has no temperature dependence and makes use of said $i_C$ in brightness discrimination.

Figure 2:
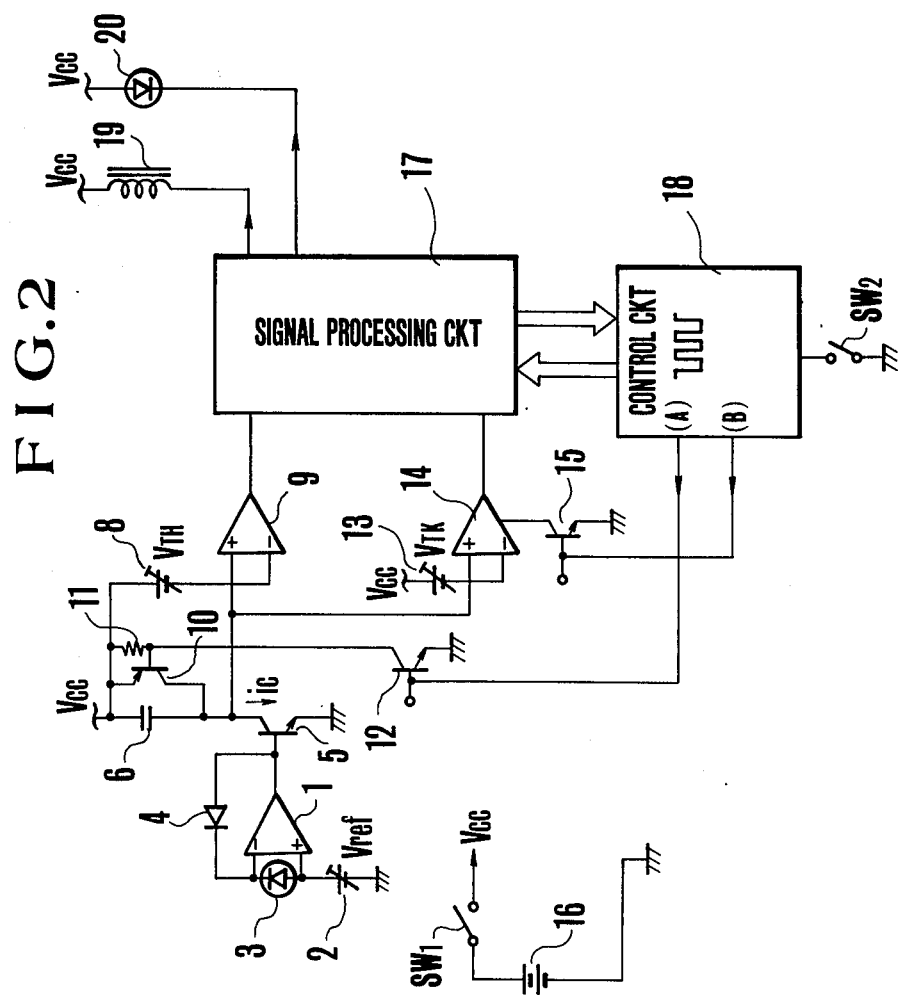
FIG. 2 is an electrical circuit diagram, partly in block form, of an embodiment of a brightness warning device according to the present invention associated with the exposure control circuit of FIG. 1.
Figure 3:
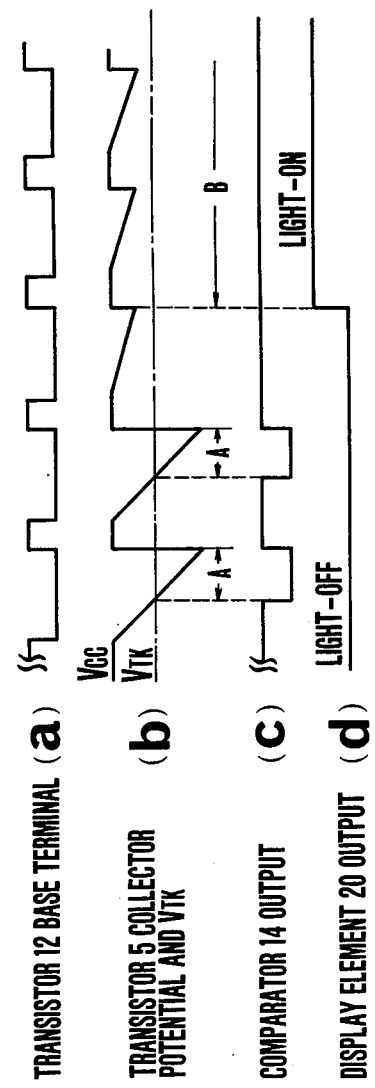
FIGS. 3a-3d are pulse timing charts illustrating the manner in which the circuit of FIG. 2 operates.
Figure 4:
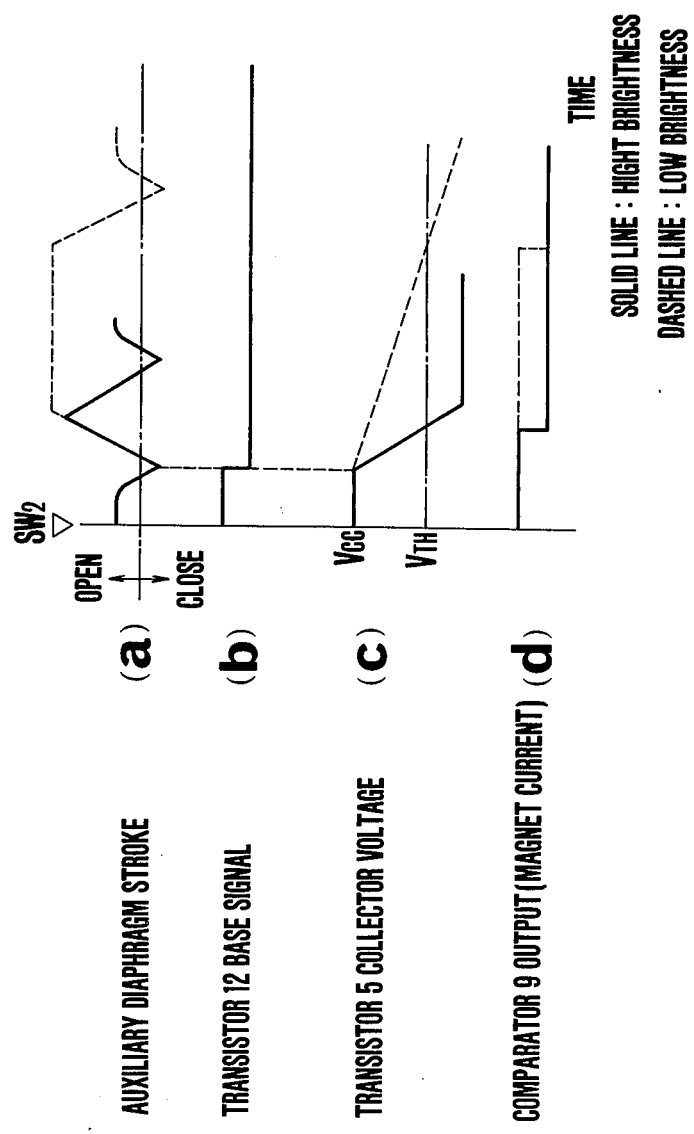
FIGS. 4a-4d present wave forms illustrating a manner in which the exposure control operates.

The present invention will be better understood from the following description of an embodiment of the brightness warning device by reference to FIGS. 2 to 6. In FIG. 2 parts similar to those illustrated in FIG. 1 are denoted by the same reference characters. A transistor 10 constitutes an electronic count switch circuitry which is controlled by electrical signals together with a pull-up resistor 11 and control transistor 12, wherein said transistor 10 discharges a charge on the capacitor 6 as it is rendered conducting when the base electrode of the transistor 12 is given a high level signal (hereinafter referred to as "H" signal) from a control circuit 18, and allows the capacitor to be charged with the $i_C$ as it is rendered non-conducting, conversely, when given a low level signal (hereinafter referred to as "L" signal). Element 13 is a reference voltage (hereinafter this reference voltage is defined by $V_{TK}$) source; element 15 is a control transistor for inhibiting or enabling the operation of a comparator 14; element 16 is an electrical power supply for the circuitry; SW1 is a main switch cooperative with, for example, a shutter button through which the circuitry is supplied with the battery voltage Vcc; element 17 is a signal processing circuit for processing the outputs of the comparators 9 and 14 properly during each step of the camera sequence advancement so that, for example, a shutter magnet 19 and a warning display element LED 20 are driven; element 18 is a control circuit portion for producing commands to function the aforesaid signal processing circuit 17 and the transistors 12 and 15 in right manner, to which are applied various signals concerning to the sequence produced from a release signal switch SW2 and the like. The aforesaid control circuit 18 has output terminals (A) and (B). Circuit 18 produces at terminal (A) a pulse train having a certain duty when the switch SW1 is on and a signal which once takes a high level when the SW2 is turned on and after a predetermined period changes to a low level, and at terminal (B) an "L" level signal when the switch SW1 is turned on, and an "H" level signal when the SW2 is turned on.

It is noted that, for the shutter in this embodiment, a shutter which also serves as a diaphragm is used, whereby the period of opening of the shutter blades is controlled, or so-called "lens shutter". It is also noted that light from an object being photographed enters into the photosensitive element 3 through (a variable sensor aperture) (not shown) whose aperture size changes as the shutter blades open and close. Further, it is assumed that said sensor aperture has a preset opening position for a predetermined aperture value before the initiation of the exposure control operation (pre-exposure mode) and is arranged upon actuation of a camera release to once change from the preset opening position to the totally closed position and then to vary the aperture size from the total closure as the shutter blades are opening (exposure mode).

Figure 5:
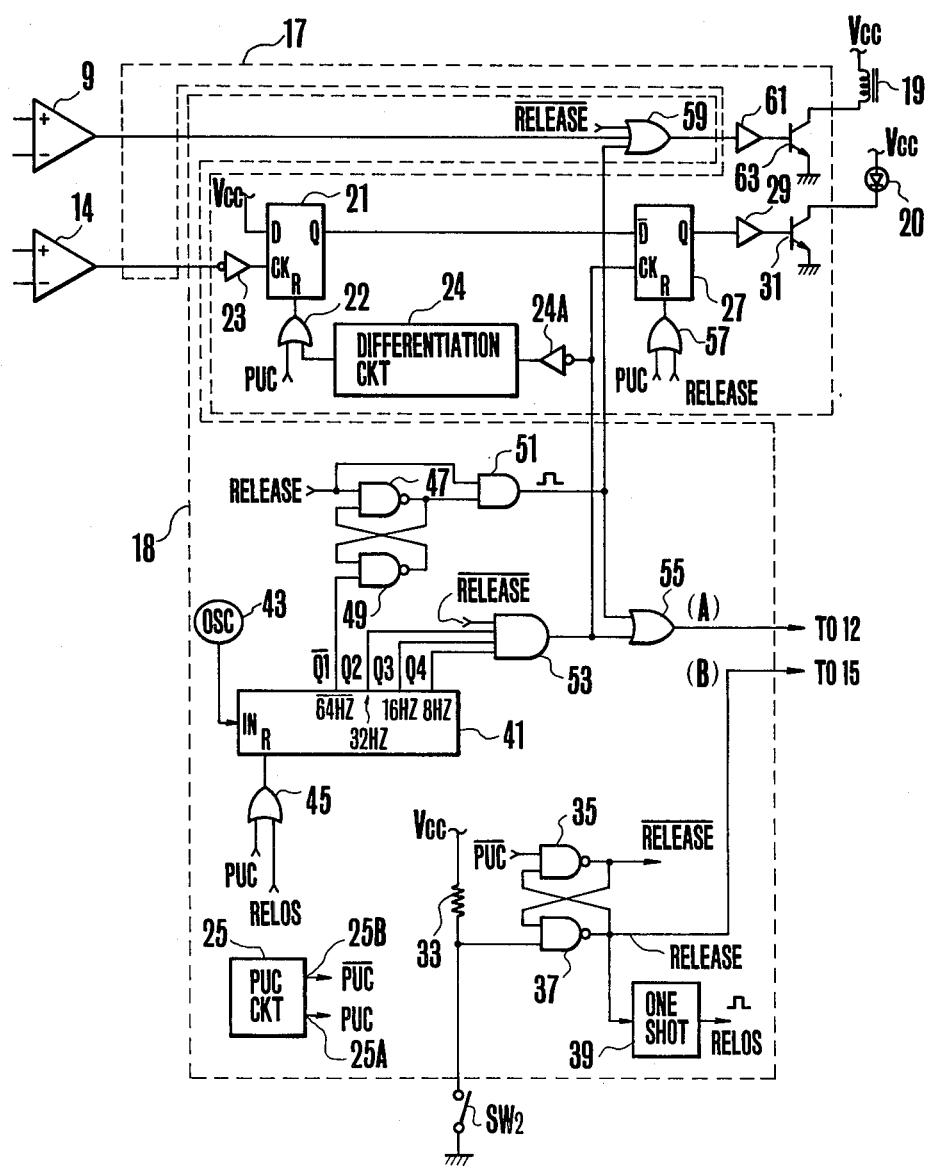
FIG. 5 is an electrical circuit diagram illustrating a practical example of the signal processing circuit 17 and control circuit 18 of FIG. 2.

FIG. 5 illustrates the details of the signal processing circuit 17 and the control circuit 18 of FIG. 2. Element 21 is a D flip-flop circuit with its clock input terminal CK connected through an inverter 23 to the output terminal of the comparator 14. The input terminal D of the flip-flop circuit 21 is connected to the electrical power source VCC, and the reset terminal R is connected through an OR gate 22 to an output terminal 25A of a power up clear circuit 25 to be described later. Element 24 is a differentiation circuit; and 24A is an inverter. A D flip-flop circuit 27 has an input terminal $\overline{D}$ which is connected to the output terminal Q of the flip-flop circuit 21, and has an output terminal Q which is connected through a buffer circuit 29 to the base of an npn transistor 31. Element 25 is the power up clear circuit having an output terminal 25A at which is produced a pulse PUC of high level in response to closure of the switch SW1 and an output terminal 25B at which is produced a pulse $\overline{PUC}$ of low level. A resistor 33 is connected to the switch SW2. NAND gates 35 and 37 form a flip-flop circuit with the gate 35 responsive to closure of the switch SW2 producing a pulse $\overline{RE\ LEASE}$ of low level, and the gate 37 forming the aforesaid output terminal (B) and responsive to closure of the switch SW2 producing a pulse RELEASE of high level. Element 39 is a mono-stable multivibrator (hereinafter abbreviated as ONE-SHOT) to be triggered by the RELEASE signal, the ONE-SHOT 39 producing a pulse RELOS of high level for a predetermined time after the closure of the switch SW2. Element 41 is a counter as a divider for counting the pulses from a pulse generator 43. The counter 41 is reset by the PUC or RELOS signal. Element 45 is an OR gate; elements 47 and 49 are NAND gates forming a flip-flop with the gate 47 having another input terminal which is connected to the output of the gate 37, and the gate 49 having another input terminal which is connected to an output terminal $\overline{Q1}$ of the counter 41 (said output terminal Q1 produces a pulse train of 64 Hz). Element 51 is an AND gate responsive to closure of the switch SW2 for producing a pulse of high level for a predetermined period. Element 53 is an AND gate with its 1st input terminal connected to the output terminal of the AND gate 35 and its 2nd to 4th input terminals connected to the output terminal Q2 to Q4 of the counter 41 respectively. Element 55 is an OR gate forming the aforesaid output terminal (A) to produce a pulse train of such wave form as illustrated in FIGS. 3(a) and 4(b). Element 57 is an OR connected to the reset terminal of the flip-flop 27; element 59 is an OR gate connected through a buffer circuit 61 to an npn transistor 63. Element 31 is a switching transistor connected to the light emitting diode 20; and element 63 is a switching transistor connected to the shutter magnet 19.

The operation of the device of such construction is as follows: When a release button (not shown) is first depressed to a first stroke position, the switch SW1 is closed, the voltage Vcc generates, the circuitry is supplied with power, and a brightness warning discrimination mode starts. Also the power up clear circuit 25 starts to operate, thereby the counter 41 and flip-flops 21 and 27 are reset by the signal from the circuit 25. Further the flip-flop 35–37 is set to produce the $\overline{RE\ LEASE}$ signal, and the magnet 19 is energized through the gate 59 and the buffer 61.

In this mode, the base terminal of the transistor 12 is given the ON and OFF pulses for opening and closing of the electronic count switch having the predetermined duty illustrated in FIG. 3(a) from the terminal (A) of the circuit 18 as has been mentioned above, and the transistor 15 is given the "L" level signal from the terminal (B) of the circuit 18, that is, the command of rendering the comparator 14 operative. It is noted that, at this time, in order to carry out the warning brightness discrimination as fast as possible, the period of the ON-OFF repeating pulse given to the base terminal of the transistor 12 is to be designed as short as possible.

When the ON-OFF repeating pulse is applied to the base of the transistor 12, as has been described above, the transistors 12 and 10 repeat the ON-OFF operation for every certain period. Therefore, the capacitor 6 is charged when the transistor 10 is OFF, thereby the collector potential of the transistor 5 is decreased from the Vcc with a speed depending upon the brightness.

Now assuming that the brightness is higher than a predetermined value, the current $i_C$ flowing through transistor 5 represents a relatively large value. Therefore, the amount of charge stored on the capacitor during the time when the transistor 10 is OFF is so large that the potential at the collector of the transistor 5 falls below the reference potential $V_{TK}$ as illustrated in FIG. 3(b) for a time indicated by A. Therefore, the comparator 14 produces "H" and "L" level signals repeatedly which are applied to the signal processing circuit 17. Since the signal processing circuit 17 is so contructed as to discriminate the output of the comparator 14 when the output of the comparator 14 changes from "H" to "L" level, and then to latch said output until the next time point of discrimination, the "L" level signal in this case is latched as the output of the comparator 14, and in responsive to said latched "L" signal, the display element 20 is held in a lighted-off position as illustrated in FIG. 3(d), informing the photographer of the fact that the brightness is at a proper level.

Alternately assuming that the brightness is below the predetermined level, then the output $i_C$ of the transistor 5 becomes small. Therefore, the amount of charge stored on the capacitor 6 during the time when the transistor 10 is OFF is so little that the potential at the collector of the transistor 5 holds a higher value than the reference potential $V_{TK}$ as in a region indicated by B in FIG. 3(b). In this case, therefore, the output of the comparator 14 becomes "H" level signal as illustrated in FIG. 3(c), and said "H" level signal is latched by the signal processing circuit 17, thereby the display element 20 is lighted on as illustrated in FIG. 3(d), warning the photographer of low brightness.

After the brightness warning operation has been carried out in such manner, when the release button (not shown) is further depressed until the second stroke position, the switch SW2 is turned on. Then, the gate 37 of the flip-flop 35, 37 produces RELEASE signal so that the output terminal (B) of the circuit 18 becomes high level. Also the ONE-SHOT circuit 39 is triggered by the RELEASE signal to produce the RELOS signal which turns to high level for a momentary predetermined period. The counter 41 is also reset by the RELOS signal at the same time as the RELEASE signal turns to "H" level and start counting again after the momentary period. The output terminal $\overline{Q1}$ is set to "H" level by the RELOS and turns to "L" level after an another predetermined period. Therefore, the AND gate 51 connected to the output of the flip-flop 47, 49 becomes high level for the predetermined time. As a result, when the switch SW2 is closed, the control circuit 18 produces high level signals at the output terminals (A) and (B) thereof. Then, the transistors 12 and 10 are instantaneously turned on by the signal from (A), thereby the charging state of the capacitor 6 is reset to the initial state, and the transistor 15 too is turned on by the signal from (B), thereby the comparing function of the comparator 14 is inhibited. Also at the same time the variable sensor aperture (not shown) is moved from the open position to the totally closed position as illustrated in FIG. 4(a). After that, as the shutter blades will gradually open, the sensor aperture will also open.

When the sensor aperture has reached the totally closed position, the output signal of the NAND gate 51 is inverted to low level as illustrated in FIG. 4(b). Then the transistors 12 and 10 are turned off, causing the capacitor 6 to be charged with the expanded current $i_C$. Therefore, the collector level of the transistor 5 is going down from the Vcc at a rate proportional to the object brightness, reaching the reference voltage $V_{TH}$ relatively fast when the brightness is high as illustrated by the solid lines in FIG. 4(c) and relatively slow when it is low as illustrated by the dashed lines. The comparator 9 produces an "L" level signal in a time depending upon the brightness as illustrated in FIG. 4(d). When the comparator 9 produces the "L" level signal in such manner, the magnet 19 is turned off through the transistor 63 in the signal processing circuit 17 to close the shutter, thus terminating the exposure control operation.

It is to be noted in connection with the above-described operation that the reason why the transistor 15 is set in the conducting state for inhibiting the function of the comparator 14 when in the exposure control mode is that, as has been mentioned above, the period of the repetitive pulse applied to the base of the transistor 12 is desired to be short for the purpose of speeding up the brightness discrimination when in the brightness warning mode, and, therefore, the value of the reference voltage $V_{TK}$ is set higher than the $V_{TH}$. In other words, in the case where the function of the comparator 14 is not inhibited while the value of the $V_{TK}$ is set higher than the $V_{TH}$, it will result that when the exposure control mode is set, the inversion of the comparator 14 is followed by the inversion of the comparator 9, permitting a bias current from the non-inverting input terminal of the comparator 14 to flow to the collector of the transistor 5, whereby the charging current to the condenser 6 is changed to make it impossible to control the exposure accurately, especially in low siene brightness where the charging current $i_C$ is very low. To obviate the above problem, provision is made so that, when in the exposure control mode, the comparator 14 is inhibited from performing the function itself by turning on the transistor 15.

Figure 6:
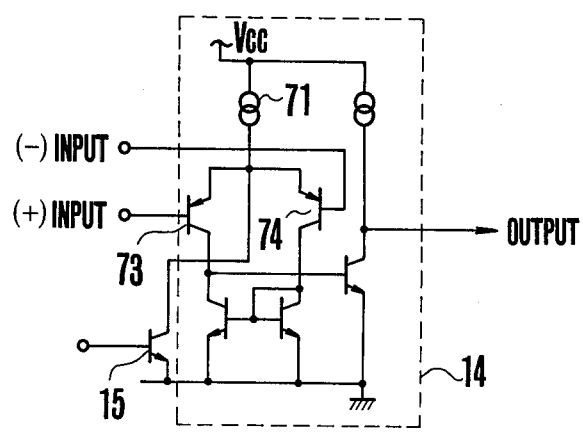
FIG. 6 is an electrical circuit diagram illustrating a practical example of the comparator 14 of FIG. 14.

The foregoing is explained in more detail reference to FIG. 6. That is, the comparator 14 includes a bias current source 71 and is rendered operative by supply of the bias current from said bias current source 71. With the comparator of such construction, the bias current flows from the non-inverting input terminal of the comparator 14 to the collector of the transistor 5 when the non-inverting input level is lower than the inverting input level. Therefore, the intensity of charging current for the capacitor 6 is decreased with the result that the accuracy of exposure control is reduced. Since the charging current $i_C$ for the capacitor 6 is very low when the ambient brightness is low, the problem of adverse effects due to above-described bias current on the accuracy of exposure control becomes serious.

In the above-described embodiment, however, as has been described above, when in the exposure control mode, the transistor 15 is rendered conducting to maintain the emitters of the transistors 73 and 74 at low level so that the constant current given to the PNP transistors 73 and 74 from the bias current source 71 is absorbed and the transistors 73 and 74 constituting the difference amplifier input stage of the comparator 14 are reversely biased to prevent current from flowing out of the non-inverting and the inverting input terminals of the comparator 14. Thus, in the above-described embodiment, when in the exposure control mode, the comparator 14 for brightness level discrimination is made inhibited from operating.

As has been described in greater detail, in the brightness warning device according to the present invention, using the current which charges the timing capacitor when in the exposure control mode, the timing capacitor is charged even when in the light metering and brightness discriminating mode whereby the brightness discrimination is made based on the level of charge stored on said capacitor with a great advantage that the brightness discriminating operation can be controlled always with high accuracy without having to provide any special temperature compensation circuit for the brightness discrimination purposes, thus providing a very suitable brightness discriminating circuit for use in a camera.

Also, in the above-described embodiment, since the capacitor 6 is repeatedly charged when in the brightness discriminating mode, it is possible to discriminate the brightness information just before the actuation of a camera release.

Further, if the charge stored on the capacitor 6 when in the brightness discriminating mode remains until the initiation of an exposure operation, it will often happen that the shutter is closed by this charge as soon as the shutter is opened by the actuation of the camera release, or by the closure of the switch SW2. But in the above-described embodiment, the capacitor 6 is short-circuited for a predetermined period at the early stage of the exposure control mode, thereby giving an additional advantage that even when the charge stored on the capacitor when in the brightness discriminating mode remains at the time when the camera is switched to the exposure control mode, this charge has no effect on the accuracy of exposure control.

What is claimed is:

1. In a warning device for a camera, said camera including light measuring means for producing a first signal corresponding to a brightness of an object to be photographed, timing means, a capacitor, said timing means producing an output signal representative of an exposure value corresponding to a first signal, detecting means connected to the capacitor for detecting the voltage level of the capacitor, and warning means for producing a brightness warning signal on the basis of the output signal from the detecting means, the improvement comprising that:
    (a) said light measuring means includes:
        (1) a differential amplifier having two input terminals and one output terminal;
        (2) a photo-sensitive element responsive to the incident light from the object and connected across two input terminals;
        (3) a diode connected to the feedback path of said amplifier so as to logarithmically compress the output from the photo-sensitive element;
        (4) a bias voltage source connected to one of the input terminals, the voltage source having the output characteristic proportional to the absolute temperature;
    (b) said timing means further includes:
        (1) a transistor provided to expand the compressed output, the transistor having a main electrode connected in series to the capacitor and a control electrode connected to the output terminal of said amplifier; and also including charging operation initiating means rendering operative the charging operation of said capacitor independent of an exposure initiating operation of said camera.

2. A warning device for a camera having timing means including a capacitor to be activated by a current corresponding to a brightness of an object to be photographed, said timing means producing an output signal related to an exposure value, said device comprising:
    (a) detecting means coupled to the capacitor for detecting the voltage level of the capacitor;
    (b) warning means for producing a warning signal on the basis of the output signal from the detecting means; and
    (c) charging operation initiating means rendering operative the charging operation of said capacitor independent of an exposure initiating operation of said camera.

3. A warning device according to claim 2, wherein said detecting means includes:
    (a) a reference voltage source;
    (b) a comparator for comparing the charge level of the capacitor with the reference voltage of said reference voltage source and producing an output signal on the basis of the charge level; and
    (c) means connected to the comparator for rendering the comparator inoperative when an exposure control operation of said camera is carried out.

4. A warning device for a camera having timing means including a capacitor to be activated by a current corresponding to a brightness of an object to be photographed, said timing means producing an output signal related to an exposure value, said device comprising:
    (a) detecting means coupled to the capacitor for detecting the voltage level of the capacitor;
    (b) warning means for producing a warning signal on the basis of the output signal from the detecting means; and
    (c) charging operation initiating means rendering the charging operation of said capacitor periodically operative independent of an exposure initiating operation of said camera.

5. A warning device according to claim 4, further comprising discharge means coupled to the capacitor for discharging the electrical charges stored on the capacitor during a predetermined time in synchronism with an exposure initiating operation of said camera.

* * * * *